(12) United States Patent  (10) Patent No.: US 8,888,880 B2
McGinnis et al.  (45) Date of Patent: Nov. 18, 2014

(54) VACUUM LOADER

(75) Inventors: Brian McGinnis, York, PA (US); Daniel P. Lehman, York, PA (US)

(73) Assignee: Air Dynamics Industrial Systems Corporation, York, PA (US)

( * ) Notice: Subject to any disclaimer, the term of this patent is extended or adjusted under 35 U.S.C. 154(b) by 475 days.

(21) Appl. No.: 13/273,922

(22) Filed: Oct. 14, 2011

(65) Prior Publication Data

US 2012/0090284 A1    Apr. 19, 2012

Related U.S. Application Data

(60) Provisional application No. 61/393,013, filed on Oct. 14, 2010.

(51) Int. Cl.
*B01D 46/02* (2006.01)
*B01D 46/42* (2006.01)
*B01D 46/00* (2006.01)

(52) U.S. Cl.
CPC ........ *B01D 46/0021* (2013.01); *B01D 2273/30* (2013.01)
USPC ................... 55/300; 55/484; 55/418; 55/428; 55/467; 55/472; 55/471; 55/482

(58) Field of Classification Search
USPC ........... 55/482, 484, 418, 428, 467, 472, 327, 55/315, 372, 373, 300
See application file for complete search history.

(56) References Cited

U.S. PATENT DOCUMENTS

| | | | | |
|---|---|---|---|---|
| 2,156,857 A | * | 5/1939 | Kroenlein | 55/357 |
| 4,036,614 A | * | 7/1977 | DeMarco | 55/310 |
| 4,385,032 A | * | 5/1983 | Fratzer et al. | 422/176 |
| 4,488,883 A | * | 12/1984 | Philp | 55/311 |
| 4,718,924 A | * | 1/1988 | DeMarco | 55/302 |
| 4,726,825 A | * | 2/1988 | Natale | 55/318 |
| 4,786,299 A | * | 11/1988 | DeMarco | 96/382 |
| 5,259,854 A | * | 11/1993 | Newman | 55/320 |
| 5,288,469 A | * | 2/1994 | Skalla | 422/171 |
| 5,603,740 A | * | 2/1997 | Roy | 55/283 |
| 6,245,120 B1 | * | 6/2001 | Stanek | 55/357 |
| 6,379,434 B1 | * | 4/2002 | Petrole | 95/287 |
| 6,569,217 B1 | * | 5/2003 | DeMarco | 55/324 |
| 6,773,479 B2 | * | 8/2004 | Debenedetti et al. | 55/482 |
| 6,786,946 B2 | * | 9/2004 | Jung | 55/302 |
| 6,936,085 B2 | * | 8/2005 | DeMarco | 55/324 |

(Continued)

OTHER PUBLICATIONS

Donaldson, "What is the Purpose of a Safety Filter?", Mar. 13, 2006, all pages http://web.archive.org/web/20060313101840/http://www.donaldson.com/en/engine/shoptalk/034146.pdf.*

*Primary Examiner* — Amber Orlando
*Assistant Examiner* — Britanny Precht
(74) *Attorney, Agent, or Firm* — PatentBest; Andrew McAleavey

(57) ABSTRACT

A vacuum loader system is disclosed. In the vacuum loader system, the air inlet comprises a load-bearing member of a support structure that supports the system. The vacuum loader system also includes a filter chamber with co-located primary and secondary or safety filter elements. A safety filter element is at the center of the filter chamber, surrounded by primary filter elements. After the air flows through the primary and safety filter elements, it is directed downwardly, out of the filter chamber and back toward the blower, beyond which it is ultimately expelled through a silenced outlet. In some embodiments, the conduit that carries air from the filter chamber toward the blower may also be a member of the support structure.

26 Claims, 4 Drawing Sheets

(56) References Cited

U.S. PATENT DOCUMENTS

| | | | |
|---|---|---|---|
| 7,222,392 B2* | 5/2007 | McCormick et al. | 15/353 |
| 7,270,690 B1* | 9/2007 | Sindel | 55/320 |
| 7,354,469 B2* | 4/2008 | Volkmann | 55/482 |
| 7,473,288 B2* | 1/2009 | Toyoda et al. | 55/282.3 |
| 7,695,537 B2* | 4/2010 | Cheng | 55/467 |
| 8,001,652 B2* | 8/2011 | Bair et al. | 15/353 |
| 8,337,575 B2* | 12/2012 | Sabourin | 55/283 |
| 2002/0112459 A1* | 8/2002 | Andress et al. | 55/498 |
| 2002/0152732 A1* | 10/2002 | Kallsen et al. | 55/482 |
| 2003/0057145 A1* | 3/2003 | Jensen | 210/121 |
| 2003/0131571 A1* | 7/2003 | Demarco | 55/324 |
| 2005/0274094 A1* | 12/2005 | DeMarco | 55/356 |
| 2007/0226950 A1* | 10/2007 | Demarco | 15/345 |
| 2007/0234906 A1* | 10/2007 | DeMarco | 96/382 |
| 2007/0251198 A1* | 11/2007 | Witter | 55/300 |

* cited by examiner

VACUUM LOADER

CROSS-REFERENCE TO RELATED APPLICATIONS

This application claims priority to U.S. Provisional Patent Application No. 61/393,013, filed Oct. 14, 2010, the contents of which are incorporated by reference in their entirety.

BACKGROUND OF THE INVENTION

1. Field of the Invention

The invention relates generally to the field of air handling and vacuum systems, and more particularly to vacuum loading and material handling systems.

2. Description of Related Art

Vacuum loaders are industrial vacuum systems that use suction to collect material in large hoppers. The hoppers can be removed from the systems to process or dispose of the collected material.

In a typical vacuum loader, a fan or blower creates suction to draw air with entrained material into an inlet. The inlet typically opens over the hopper, and the entrained material is allowed to fall into the hopper. The air stream is then directed into a filter chamber, where filters remove any remaining entrained material while allowing the air to pass. Typically, filtered air exits out of the top of the filter chamber and passes through a separate housing containing a safety filter, the purpose of which is to protect the downstream fan or blower from damage. After passing through the safety filter, the filtered air is drawn through the fan or blower and exhausted to atmosphere.

Conventional piping and tubing are used to construct the typical airflow pathway in a vacuum loader. That piping can increase the overall cost of the system, and can also create difficulties in routing and arranging the piping.

SUMMARY OF THE INVENTION

One aspect of the invention relates to a vacuum loader system. In the vacuum loader system, the air inlet comprises a load-bearing member of a support structure that supports the system. The vacuum loader system also includes a filter chamber with co-located primary and secondary or safety filter elements. A secondary or safety filter element is at the center of the filter chamber, surrounded by primary filter elements. After the air flows through the primary and safety filter elements, it is directed downwardly, out of the filter chamber and back toward the blower, beyond which it is ultimately expelled through a silenced outlet.

Another aspect of the invention relates to a filter chamber for an industrial vacuum system. The filter chamber comprises a chamber housing and a rack disposed at the top of the housing. A plurality of primary filter elements are connected to the rack and are arranged around the filter chamber such that air entering the filter chamber passes through the primary filter elements. The chamber also comprises at least one secondary filter element within the chamber housing. The secondary filter element is of a different type than those of the plurality of primary filter elements and is arranged relative to the primary filter elements such that air filtered by the primary filter elements passes through the secondary filter element.

Yet another aspect of the invention relates to a loader vacuum system. The loader vacuum system comprises a load bearing support structure, a hopper, a filter chamber, and a fan or blower. At least one load-bearing member of the support structure acts as an airflow inlet member. The airflow inlet member has an inlet opening and an outlet opening. The hopper is positioned to catch material entrained in an airstream leaving the outlet opening of the airflow inlet member. The filter chamber is supported by the support structure and includes a plurality of primary filter elements arranged around the filter chamber such that air entering the filter chamber passes through the primary filter elements. At least one secondary filter elements is essentially surrounded by the plurality of primary filter elements such that air passes through the at least one secondary filter element after it has passed through the plurality of primary filter elements. The fan or blower is supported by the support structure and is coupled to an air flow pathway that includes the airflow inlet member of the support structure and the filter chamber. So arranged, the fan or blower draws air into the inlet opening of the airflow inlet member, over the hopper, through the filter chamber, and then through the fan or flower in such a way that material entrained in air drawn into the inlet opening will be at least substantially deposited in the hopper before the air enters the filter chamber.

These and other aspects, features, and advantages of the invention will be set forth in the description that follows.

BRIEF DESCRIPTION OF THE DRAWING FIGURES

The invention will be described with respect to the following drawing figures, in which like numerals represent like elements throughout the figures, and in which.

DETAILED DESCRIPTION

Figure 1:
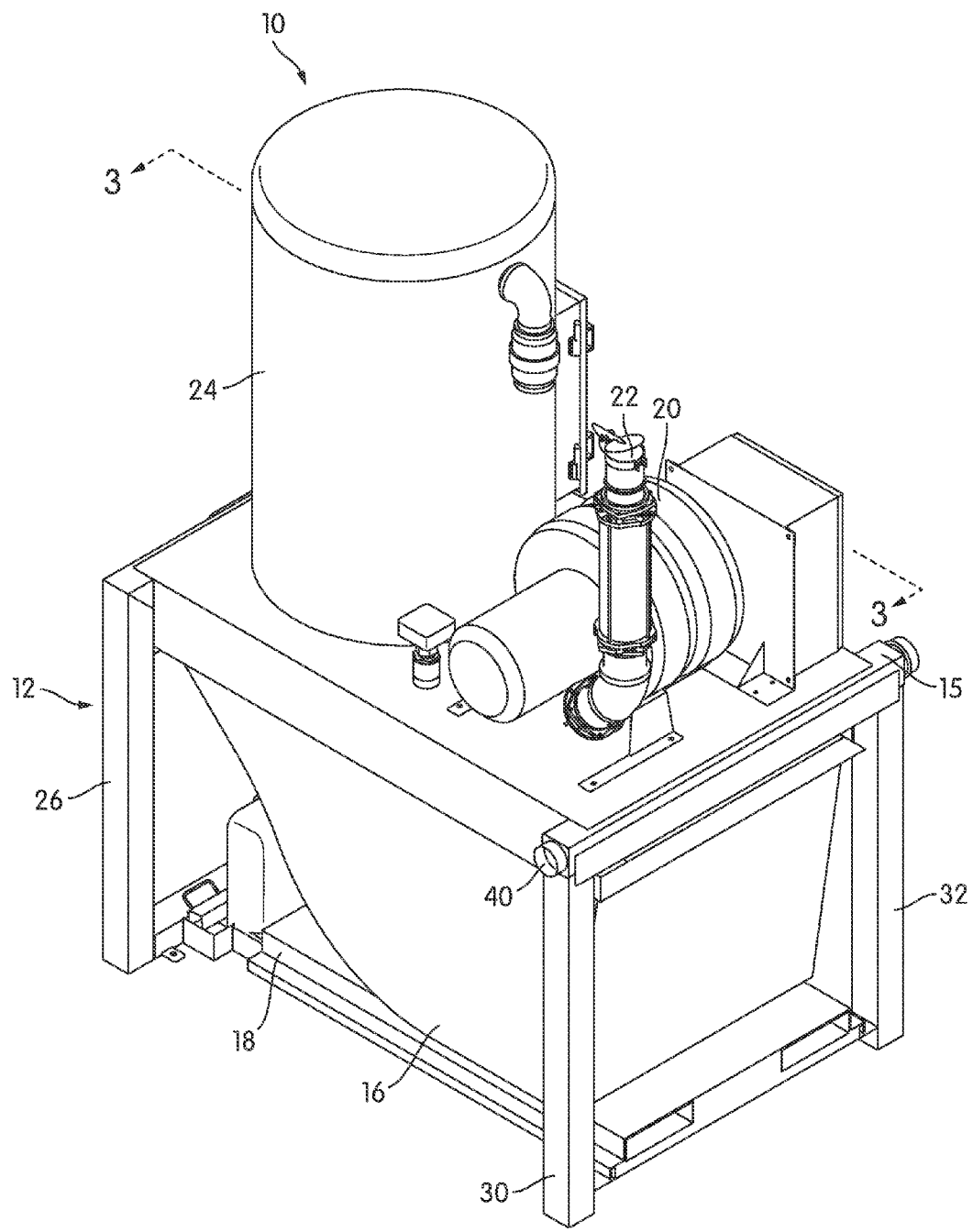
FIG. 1 is a perspective view of a vacuum loader system according to one embodiment of the invention.

FIG. 1 is a perspective view of a vacuum loader system, generally indicated at 10, according to one embodiment of the invention. The vacuum loader system 10 includes a frame or support structure 12, which is shown in the perspective view of FIG. 2. The support structure 12 rests on the floor or another surface, supports the system 10, and, as will be described below in more detail, includes an inlet 14. A hopper 16 is positioned under the support structure 12 to catch material entrained in the inlet air, and is carried by a pallet jack 18 in the illustrated embodiment for easy removal and handling. Above the support structure 12, a fan or blower assembly 20 draws air into the inlet 14, through the system 10, and out a silenced exhaust 22. A filter chamber 24 contains a plurality of filter elements that filter the air after most of the entrained material has been deposited in the hopper 16.

Figure 2:
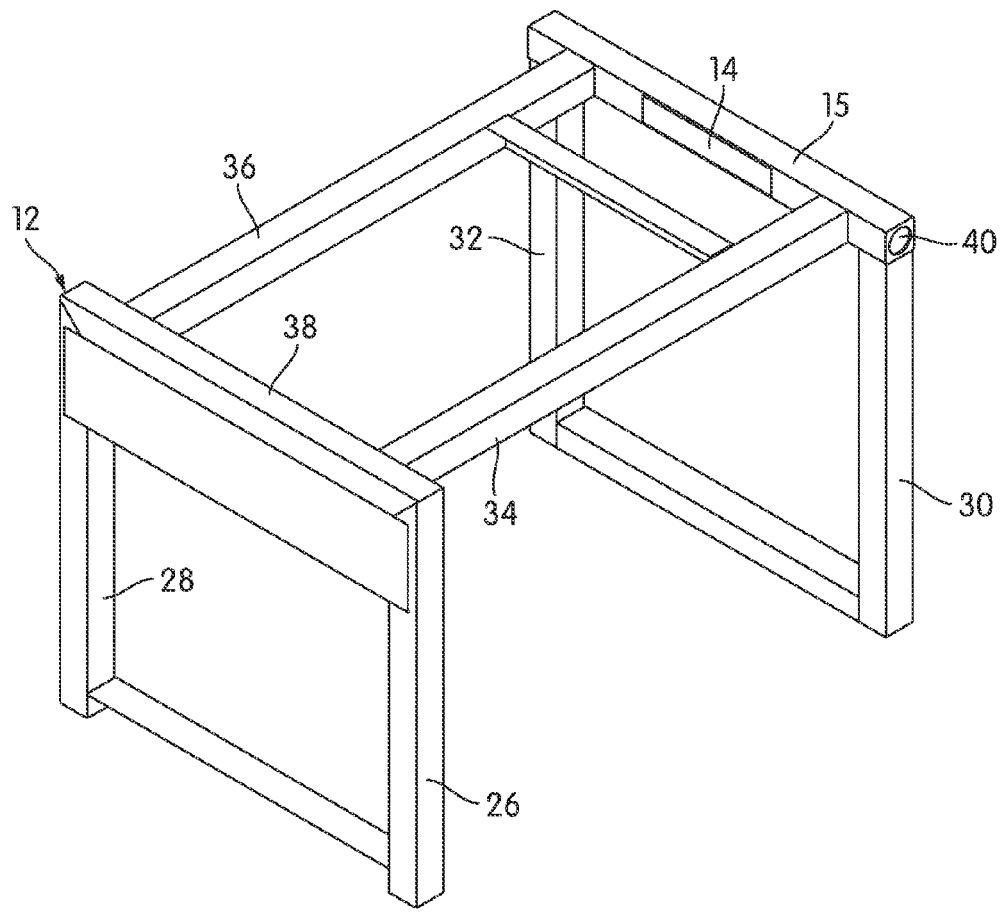
FIG. 2 is a perspective view of the support frame of the vacuum loader system of FIG. 1.

As shown in FIG. 2, the support structure 12 of the illustrated embodiment is comprised of a number of sections of square or rectangular tubing that define four legs 26, 28, 30, 32. The legs 26, 28, 30, 32 support a cross-braced four-member top frame, also comprised of sections of rectangular tubing, including two longer sides 34, 36, and two shorter sides 15, 38. The inlet member 15, which contains the inlet 14, is a part of the top frame, and thus serves a dual function as both an air inlet and a structural support member. The support structure 12 may be defined, for example, by 4 inch rectangular tubing. However, as those of skill in the art will realize, the manner in which the support structure 12 contacts the ground or floor level to support the system 10 is not critical to the invention, so long as it provides the requisite amount of support. More or fewer legs may be used, and in some embodiments, alternative structures, like cross-braced, interconnected frames, may be used. In some embodiments, the lower portion of the support structure 12 may be fully enclosed by panels or other such structures.

The inlet member 15 has a round coupling 40 that allows it to connect to a standard hose. Once air enters the coupling 40, the inlet member 15 broadens into a square interior cross-section. The inlet 14 of the illustrated embodiment comprises a wide rectangular slot on the inner side of the inlet member 15 that allows the air and entrained material to move out of the inlet member 15 and pass over the hopper 16, where the entrained material is deposited by gravity. The coupling 40 may be, for example, a 3-inch round pipe, with the inlet member 15 being comprised of 4-inch square tubing.

The support structure 12 is generally designed symmetrically, such that either of the short top frame members 15, 38 could serve as an inlet member and, more broadly, such that any of the top frame members 15, 34, 36, 38 could be configured as an inlet member in some embodiments. In some embodiments, the inlet member 15 may be the only member of the support structure 12 that is open to air passage; the other top frame members 34, 36, 38 may be sealed off. However, in other embodiments, all of the top frame members 34, 36, 38 may be open to air passage. Opening all of the top frame members 15, 34, 36, 38 to air passage facilitates the interchangeable selection of any one of the members 15, 34, 36, 38 as the inlet, and it may have other beneficial effects as well.

More specifically, if all of the top frame members 15, 34, 36, 38 are open to the passage of air, then incoming air may flow around the top frame of the support structure 12 and impinge on itself, which may serve two beneficial purposes. First, the impinging air flowing around the inlet may help to deposit a fine layer of particulate material on the insides of the top frame members 15, 34, 36, 38, which protects the interior of the members 15, 34, 36, 38 from wear. Second, the impinging air flows tend to slow the incoming air, which may help in depositing the greatest possible quantity of material into the hopper 16. The change in cross-section of the inlet member 15 from round to rectangular and the commensurate increase in cross-sectional area also tends to slow the incoming air somewhat.

Figure 3:
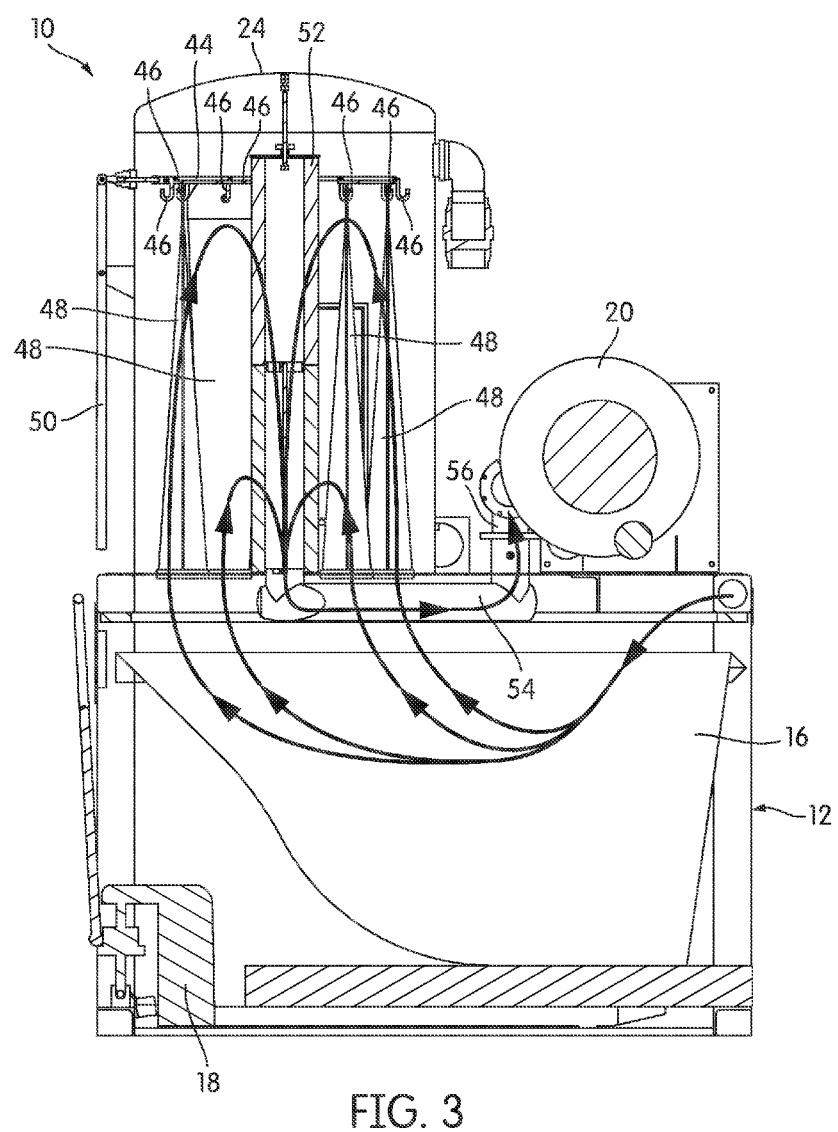
FIG. 3 is a sectional view of the vacuum loader system of FIG. 1, illustrating air flow paths within the system.

FIG. 3 is a sectional view of the vacuum loader system 10, taken through Line 3-3 of FIG. 1. As shown in FIG. 3, once the air passes over the hopper 16, it is directed upward, into the filter chamber 24. The filter chamber 24 is a generally cylindrical chamber with a slightly domed top, and it is generally made of a metal, such as steel. A rack 44 is suspended within the filter chamber 24; depending on the embodiment, it may hang from a chain or cord attached to the top of the filter chamber 24 or it may be attached to and cantilevered from the sidewall of the filter chamber 24. The rack 44 has a plurality of hooks 46 that are constructed and arranged to receive and support a corresponding plurality of primary filter elements 48 (not shown in FIG. 5). The rack 44 is also attached to a shaker or agitator mechanism in the form of a lever 50 and associated structures that are connected to the rack 44 and can be actuated to shake the rack 44. Shaking the rack 44 can help to remove material that has been deposited on the primary filter elements 48.

The primary filter elements 48 of the illustrated embodiment are semi-conical bags. They may be made of any typical filter material. For example, the primary filter elements 48 may be made of a polyester felt with a weight of about 16 ounces per square yard. Generally, the rack 44 and its hooks 46 are arranged such that there are enough primary filter elements 48 to cover approximately the entire inner circumference of the filter chamber 24 and fill substantially the entirety of the space within the filter chamber 24.

As was described briefly above, a standard filter chamber for an industrial vacuum system might contain only filter elements similar to the primary filter elements 48. However, in the system 10, the primary filter elements 48 are co-located in the filter chamber 24 with secondary or safety filter element or elements 52. The secondary filter element 52 or elements of the illustrated embodiment are suspended from the top of the filter chamber 24 and are positioned at the center of the filter chamber 24, such that they are at least substantially entirely surrounded by primary filter elements 48. The positioning of the secondary filter elements 52 is primarily intended to ensure that air reaching the secondary filter elements 52 has already been filtered by the primary filter elements 48.

In the illustrated embodiment, there are two secondary filter elements 52 placed such that their ends abut one another. The primary purpose of the secondary filter elements 52 is to provide an element of safety and ensure that air cannot reach the fan or blower 20 unless it has been filtered, so as to ensure that the fan or blower 20 is not damaged by any material that might otherwise be entrained in the air. The secondary filter elements 52 may be any type of filter elements used in the art for this purpose, and in the illustrated embodiment are standard cartridge filter elements. In some embodiments, the nature of the secondary filter elements 52, their number, and characteristics may be dictated by the manufacturer of the fan or blower 20, or by the nature of the filtration that should be achieved in order to protect the fan or blower 20. The co-located primary and secondary filter elements 48, 52 eliminate the necessity of building a separate housing for the secondary filter elements 52.

The filter chamber 24 may include a surge valve positioned such that if the primary filter elements 48 become blocked, the surge valve will open to allow incoming air to bypass the primary filter elements 48 and flow directly to the secondary filter elements 52. This bypass flow continues to cool the fan 20 so as to avoid overheat and mechanical breakdown. As was described above, in some cases, the primary filter elements 48 may be unblocked by using the agitator lever 50; in other cases, the filter chamber 24 may need to be opened and the primary filter elements 48 replaced.

As shown in FIG. 3, once filtered air passes through the secondary filter elements 52, it transits a short section of pipe 54 that lies under the filter chamber 24 and the fan 20 and within the support assembly 12. An elbow 56 connects the pipe 54 with the fan 20.

Figure 4:
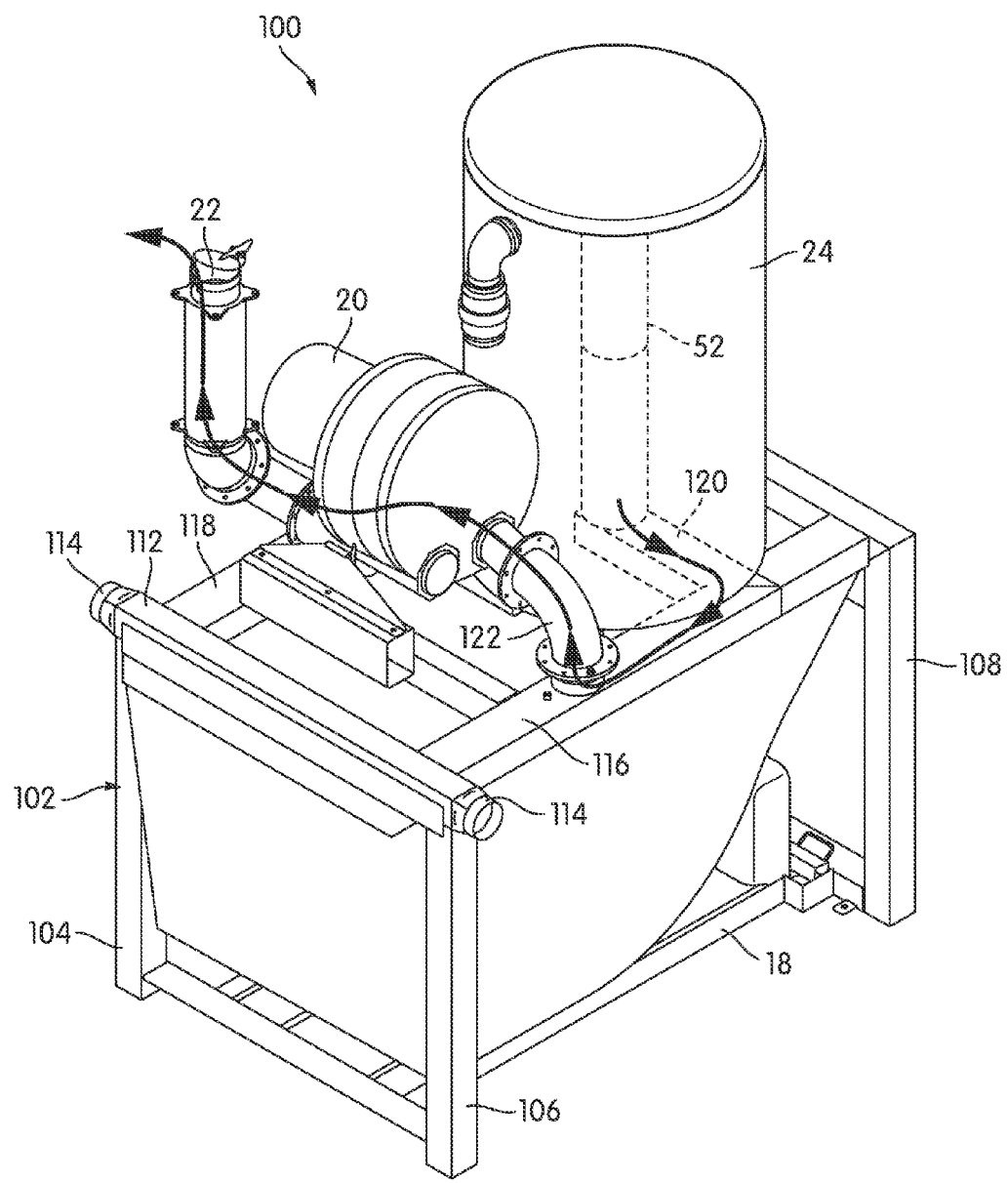
FIG. 4 is a perspective view of a vacuum loader system according to another embodiment of the invention.

FIG. 4 is a perspective view of another embodiment of a vacuum loader system, generally indicated at 100. The vacuum loader system 100 is generally similar to the vacuum loader system 10 of the previous embodiment; therefore, those elements not described with respect to the vacuum loader system 100 may be assumed to be similar to the corresponding elements of the vacuum loader system 10.

The vacuum loader system 100 has a support structure 102. Like the support structure 12, the support structure 102 has a plurality of legs 104, 106, 108, and may have or use additional supports as well. (In the view of FIG. 4, a fourth leg is not shown.) In the upper portion of the support structure 102, one of the shorter sides acts as an inlet member 112 and provides both structural support and a flow pathway for incoming air. Like the inlet member 15, the inlet member 112 has round couplings 114 at its ends to mate with a connecting hose or tube through which the air is to be drawn. Whichever coupling 114 is not being used may be plugged.

The primary difference in the vacuum loader system 100 is that the support structure 102 provides both inlet and outlet members for air flow. Specifically, the long sides 116, 118 of the upper frame are broadened and flattened relative to their counterparts 34, 36 in the system 10. One of the long sides 116 is used to carry the air flow from the secondary filter elements 52 within the filter chamber 24 back to the fan or blower 20. Specifically, a short spur of rectangular tubing 120 serves to connect the outflow from the secondary filter elements 52 with the long side 116 that acts as the outlet/air return member. Beyond the point where the long side outlet member 116 joins the connecting spur 120, the long side 116 is sealed to air flow in a way that prevents incoming air flow that might otherwise be flowing around in a circuit from the inlet member 112 from mixing with the outgoing air flow. Thus, incoming "dirty" air is not permitted to mix with outgoing "clean" air. A short, round elbow of pipe 122 connects between the top face of the long side outlet member 116 and the fan or blower 20 to return the air to the fan or blower 20.

As with the use of a support member 14 as an inlet member, the use of a support member 116 as an outlet/air return member simplifies the construction of the system 100, eliminates the need for a separate flow pathway for the clean air that is returning to the fan or blower 20, and results in a commensurate cost savings in the construction of the system 100.

Vacuum loader systems 10, 100 according to embodiments of the invention may include metal or plastic sheeting or other materials atop the support structure 12, 102 to conceal the inlet and outlet members, prevent material in the hopper 16 below from blowing upward, and to perform other functions. If such sheeting is provided, the fan or blower 20, the flange of the connecting pipe 122, and other structures may be secured to it.

The support structures 12, 102 described above use tubing of square and rectangular cross-sections, but tubing of any shape or cross-section may be used, including round tubing. However, as was described above, it may be useful in at least some embodiments if the cross-sectional area of the tubing increases as the air enters the support structures 12, 102. Additionally, the inlets and outlets may use any form of coupling, piping, or connecting hose to connect with the hoses or other structures that may be used with the vacuum loader systems 10, 100.

Although the invention has been described with respect to certain embodiments, the embodiments are intended to be exemplary, rather than limiting. Modifications and changes may be made within the scope of the invention, which is defined by the appended claims.

What is claimed is:

1. A vacuum loader system, comprising:
   a load-bearing support structure, at least one load-bearing member of the support structure acting as an airflow inlet member, the airflow inlet member having an inlet opening and an outlet opening;
   a filter chamber supported by the support structure, the filter chamber including a plurality of primary filter elements arranged around the filter chamber such that air entering the filter chamber passes through the primary filter elements, and at least one secondary filter element essentially surrounded by the plurality of primary filter elements such that air passes through the at least one secondary filter element after it has passed through the plurality of primary filter elements; and
   a fan or blower supported by the support structure, the fan or blower being coupled to an air flow pathway that includes the airflow inlet member of the support structure and the filter chamber, such that the fan or blower draws air into the inlet opening of the airflow inlet member, through the filter chamber, and then through the fan or blower in such a way that material entrained in air drawn into the inlet opening will be at least substantially deposited in a container before the air enters the filter chamber;
   wherein the load-bearing support structure further comprises at least one load-bearing outlet/return member coupled between the filter chamber and the fan or blower to carry air from the at least one secondary filter element toward the fan or blower.

2. The vacuum loader system of claim 1, wherein the load-bearing support structure comprises a plurality of members of tubing of square or rectangular cross-section.

3. The vacuum loader system of claim 2, wherein the load-bearing support structure comprises a plurality of legs and an upper support frame supported by the legs such that the airflow inlet member comprises a member of the upper support frame.

4. The vacuum loader system of claim 3, wherein the outlet/return member is a member of the upper support frame.

5. The vacuum loader system of claim 4, wherein the outlet/return member is flow isolated from the inlet member.

6. A filter chamber for an industrial vacuum system, comprising:
   a chamber housing;
   a plurality of primary bag filter elements mounted within the chamber housing, the primary bag filter elements being arranged around the filter chamber such that air entering the filter chamber passes through the primary bag filter elements; and
   at least one secondary cartridge filter element within the chamber housing, the at least one secondary cartridge filter element being arranged relative to the plurality of primary bag filter elements such that air filtered by the primary bag filter elements passes through the at least one secondary cartridge filter element.

7. The filter chamber of claim 6, further comprising:
   a rack disposed at the top of the housing, the rack being connected to the plurality of primary bag filter elements to mount them within the chamber housing; and
   an agitation cleaning mechanism connected to the rack.

8. The filter chamber of claim 1, wherein the plurality of primary bag filter elements essentially surrounds the at least one secondary cartridge filter element.

9. The filter chamber of claim 6, further comprising a clean air outlet that receives the air that passes through the at least one secondary cartridge filter element.

10. The vacuum loader system of claim 3, wherein a plurality of members of the upper, load-bearing frame are open to air passage and are in fluid communication with one another, such that the air drawn into the inlet opening will impinge on itself.

11. The filter chamber of claim 6, further comprising an air outlet protected by the at least one secondary cartridge filter element, such that the air filtered by the primary bag filter elements cannot leave the filter chamber without first being filtered by the at least one secondary cartridge filter element.

12. The filter chamber of claim 11, further comprising an air inlet, the air inlet being located along a bottom of the filter chamber.

13. The filter chamber of claim 11, wherein the air outlet is located along a bottom of the filter chamber.

14. An industrial vacuum system, comprising:
    a chamber housing;
    a plurality of primary filter elements mounted within the chamber housing, the primary filter elements being arranged around the filter chamber such that air entering the filter chamber passes through the primary filter elements; and either (1) a single secondary filter element, or (2) a single column of the secondary filter elements comprised of two or more of the secondary filter elements placed abutting one another end-to-end;

wherein the secondary filter element or elements are of a type different than a type of the primary filter elements and are surrounded by the plurality of primary filter elements such that air filtered by the primary filter elements passes through the secondary filter element or elements.

15. The industrial vacuum system of claim 14, wherein the plurality of primary filter elements are separate from, and spaced from, one another.

16. The industrial vacuum system of claim 14, further comprising an air outlet in the chamber housing, the air outlet being arranged such that it receives air that has passed through the secondary filter element or elements.

17. The industrial vacuum system of claim 16, further comprising a fan or blower in fluid communication with the air outlet.

18. The industrial vacuum system of claim 17, wherein the vacuum system does not include any additional filters between the outlet and the fan or blower.

19. The industrial vacuum system of claim 14, wherein the plurality of primary filter elements comprise bag filters.

20. The industrial vacuum system of claim 19, wherein the secondary filter element or elements comprise cartridge filters.

21. The industrial vacuum system of claim 14, further comprising an air inlet in a bottom of the chamber housing.

22. The industrial vacuum system of claim 14, further comprising:

a rack disposed at the top of the chamber housing, the rack being connected to the plurality of primary filter elements to mount them within the chamber housing; and an agitation cleaning mechanism connected to the rack.

23. The industrial vacuum system of claim 22, wherein the plurality of primary filter elements comprise bag filters.

24. The industrial vacuum system of claim 23, further comprising an air inlet in a bottom of the chamber housing, such that air entering the chamber housing flows upwardly into openings of the bag filters.

25. A vacuum loader system, comprising:

a load-bearing support structure, at least one load-bearing member of the support structure acting as an airflow inlet member, the airflow inlet member having an inlet opening and an outlet opening;

a filter chamber supported by the support structure, the filter chamber including a plurality of bag filter elements arranged around the filter chamber such that air entering the filter chamber passes through the bag filter elements, and at least one secondary cartridge filter element essentially surrounded by the plurality of bag filter elements such that air passes through the at least one cartridge filter element after it has passed through the plurality of bag filter elements; and a fan or blower supported by the support structure, the fan or blower being coupled to an air flow pathway that includes the airflow inlet member of the support structure and the filter chamber, such that the fan or blower draws air into the inlet opening of the airflow inlet member, through the filter chamber, and then through the fan or blower in such a way that material entrained in air drawn into the inlet opening will exit the outlet opening in the airflow inlet member and be at least substantially deposited in a container before the air enters the filter chamber.

26. The vacuum loader system of claim 25, wherein the load-bearing support structure further comprises at least one load-bearing outlet/return member coupled between the filter chamber and the fan or blower to carry air from the at least one secondary filter element toward the fan or blower.

* * * * *